United States Patent [19]

Molitor

[11] 4,071,935
[45] Feb. 7, 1978

[54] METHOD OF MAKING HEAT EXCHANGES

[75] Inventor: Victor D. Molitor, Denver, Colo.

[73] Assignee: Stainless Equipment Company, Englewood, Colo.

[21] Appl. No.: 621,284

[22] Filed: Oct. 10, 1975

Related U.S. Application Data

[63] Continuation-in-part of Ser. No. 602,685, Aug. 7, 1975, abandoned, and a continuation-in-part of Ser. No. 768,152, Feb. 14, 1977.

[51] Int. Cl.$^2$ ............................................. B23P 15/26
[52] U.S. Cl. .............................. 29/157.3 R; 165/181; 165/164; 165/171; 165/152
[58] Field of Search ............... 165/151, 152, 164, 171, 165/181, 185, 186, 165; 29/157.3 R, 157.3 C

[56] References Cited

U.S. PATENT DOCUMENTS

| | | | |
|---|---|---|---|
| 3,217,798 | 11/1965 | Renzi | 29/157.3 R |
| 3,262,190 | 7/1966 | Rostoker et al. | 29/157.3 R |
| 3,393,297 | 7/1968 | Hart | 165/185 X |
| 3,445,910 | 5/1969 | Duryee et al. | 29/157.3 R |
| 3,639,963 | 2/1972 | Maher | 29/157.3 R |
| 3,681,843 | 8/1972 | Arcella et al. | 29/157.3 R |

FOREIGN PATENT DOCUMENTS

| | | | |
|---|---|---|---|
| 4,327,959 | 2/1968 | Japan | 29/157.3 R |

Primary Examiner—C.W. Lanham
Assistant Examiner—V. K. Rising
Attorney, Agent, or Firm—Horace B. Van Valkenburgh; Frank C. Lowe

[57] ABSTRACT

A series of mesh layers, approximating a loosely woven cloth, are placed between successive adjacent, parallel tubular coils or bends through which a liquid flows. The assembly of coils and mesh layers is compressed to produce a clamping contact between the mesh and each of two opposed coils, as well as compressing the mesh together, both within and outside the areas of the coils. The mesh which intersects an end of the coil is split, so that the mesh may lie on both sides of the coil at that position. A perforated plate may be placed at each end of the mesh and coil assembly, with a screen interposed, in order to maintain the mesh and coils in a clamped condition. The perforated plates may be spot welded to the inside of a housing, the parts of which are also compressed against the mesh and coil assembly. The compression of the mesh against the coils not only provides a greater area of contact of the fibers, strands, wires, etc., of the mesh, but also produces a clamping or pressure contact. In addition, a greater number of wires, strands, etc., of the mesh are in contact with the surface of a coil, or clamped between two coils with other wires, strands, etc., thereby increasing the amount of heat conducted through the mesh and to or from a gas or vapor passing through the mesh.

11 Claims, 13 Drawing Figures

U.S. Patent  Feb. 7, 1978  Sheet 1 of 4  4,071,935
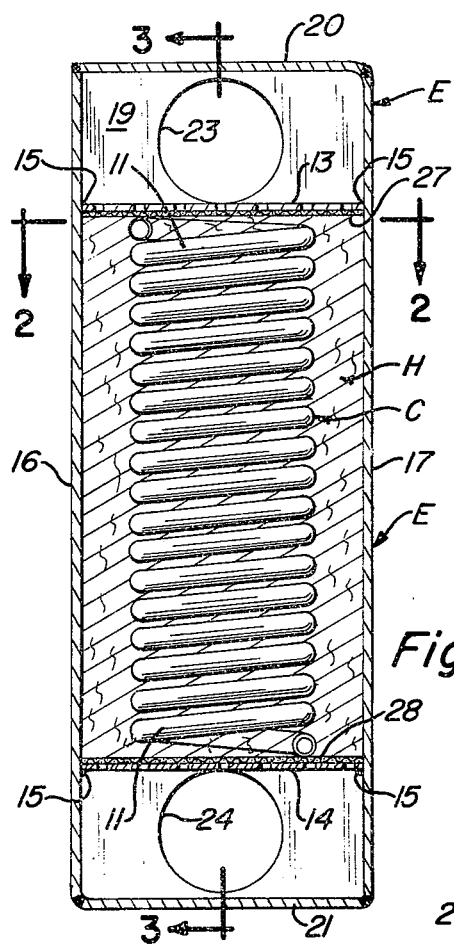
Fig_1
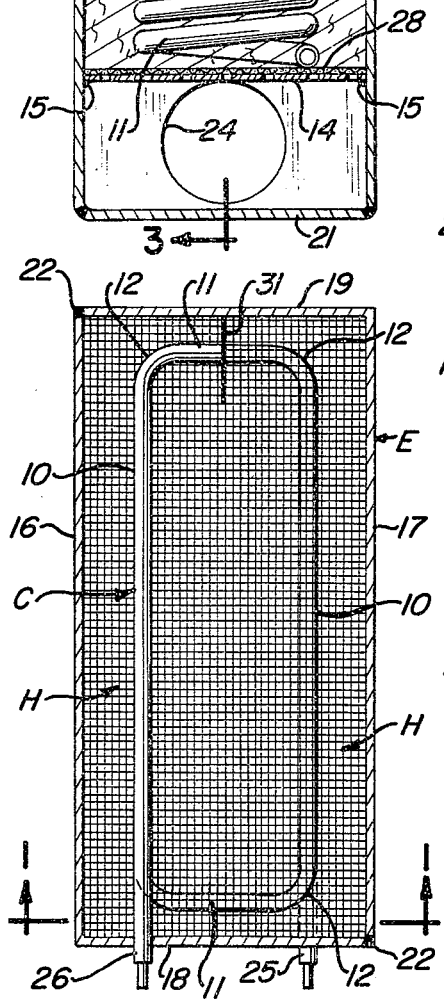
Fig_2
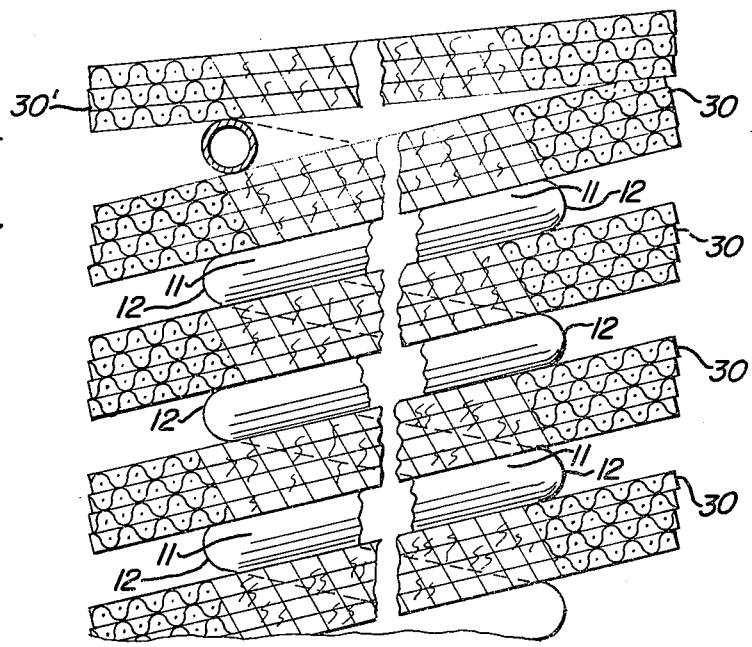
Fig_4
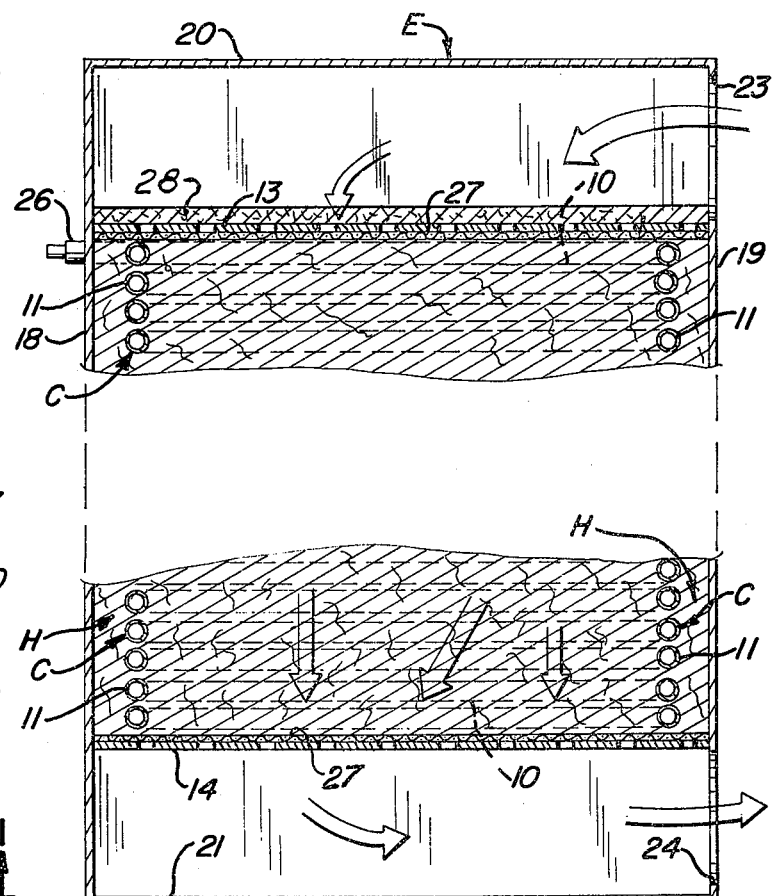
Fig_3

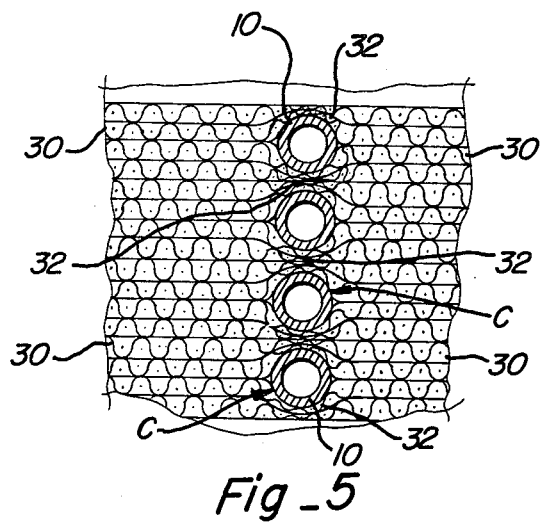
Fig_5
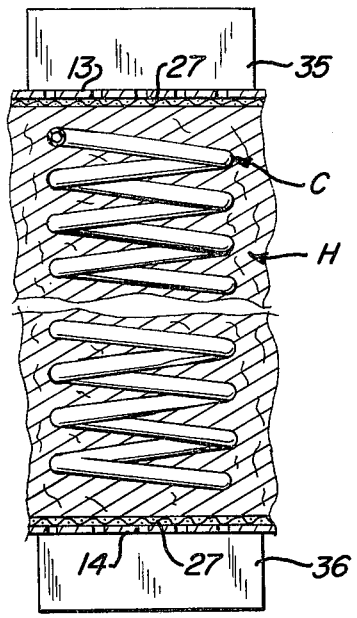
Fig_6
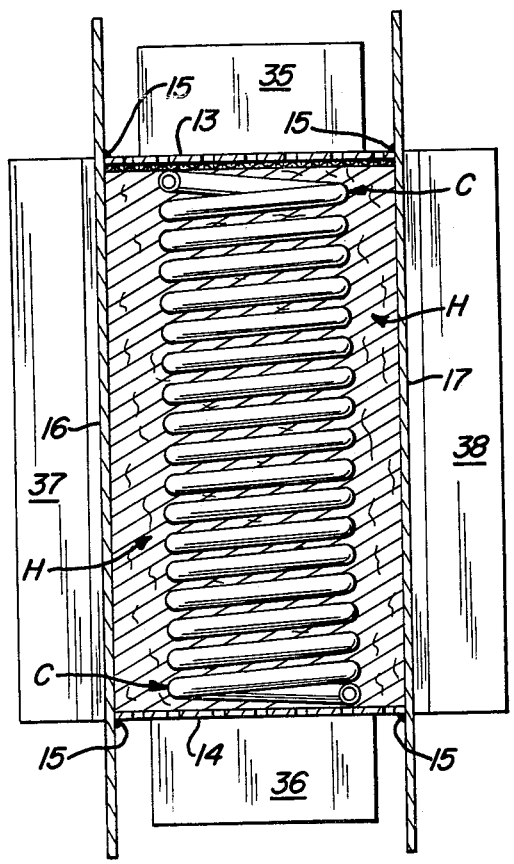
Fig_7
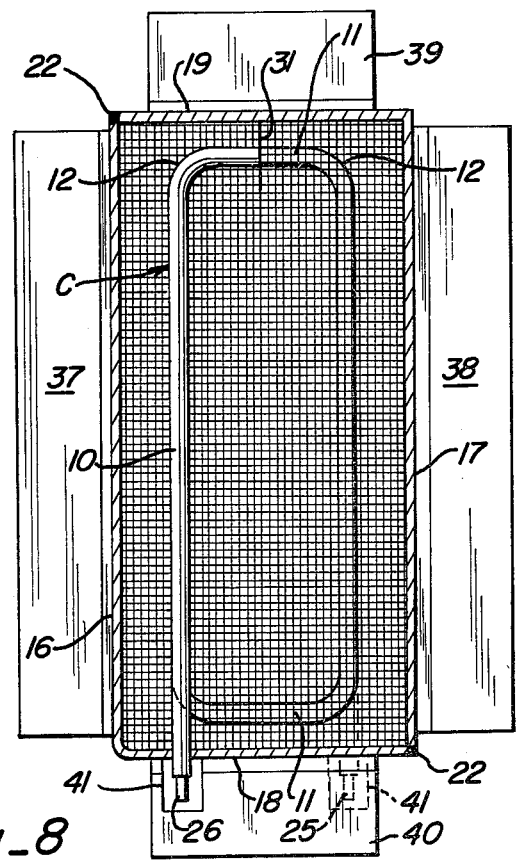
Fig_8

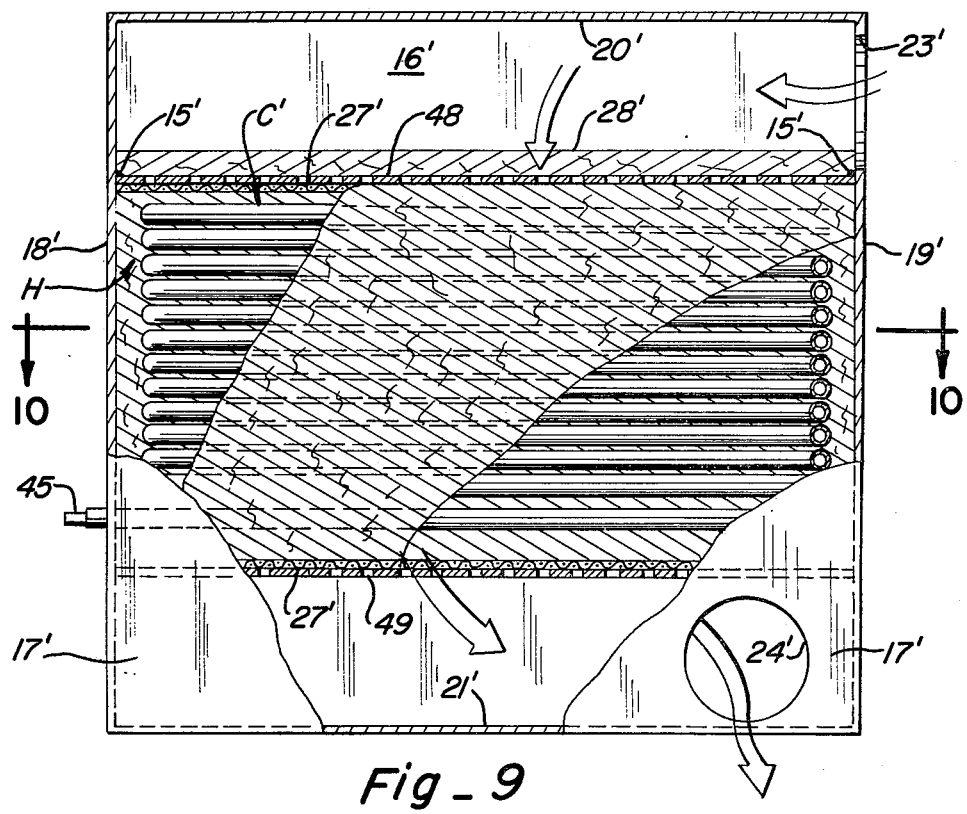
Fig_9
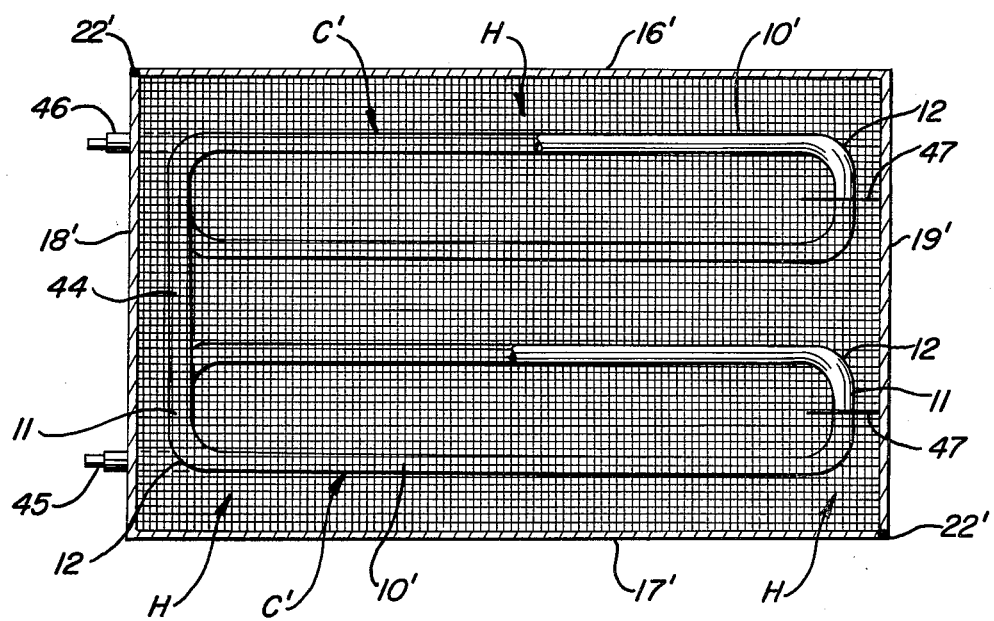
Fig_10

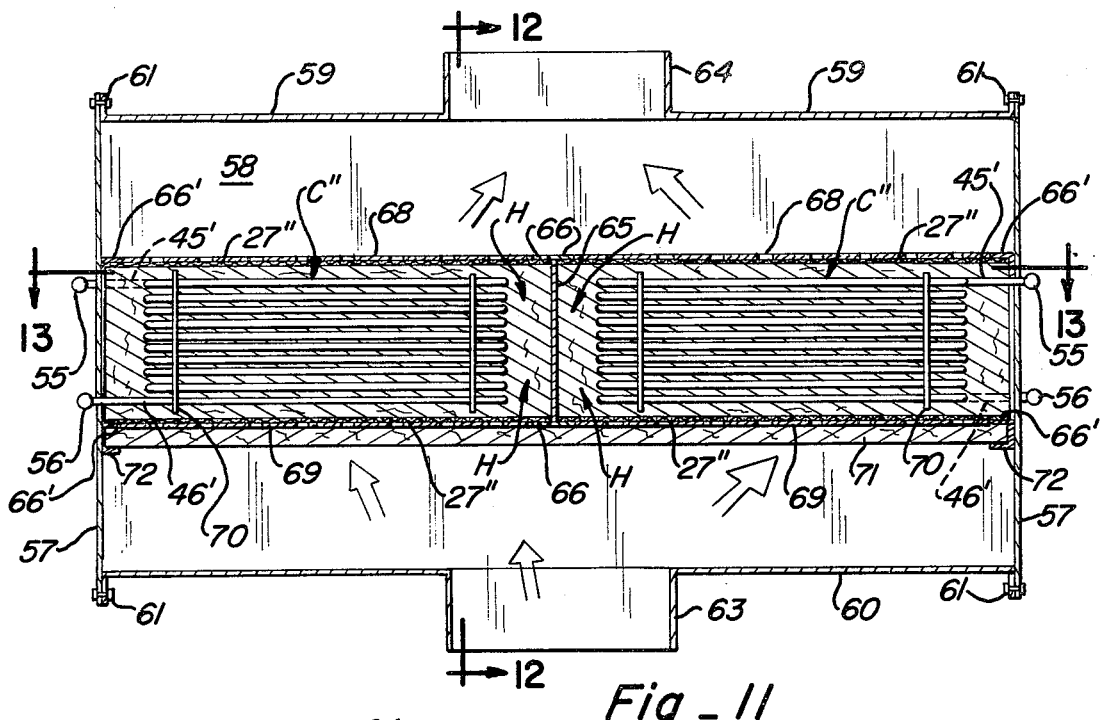
Fig_11
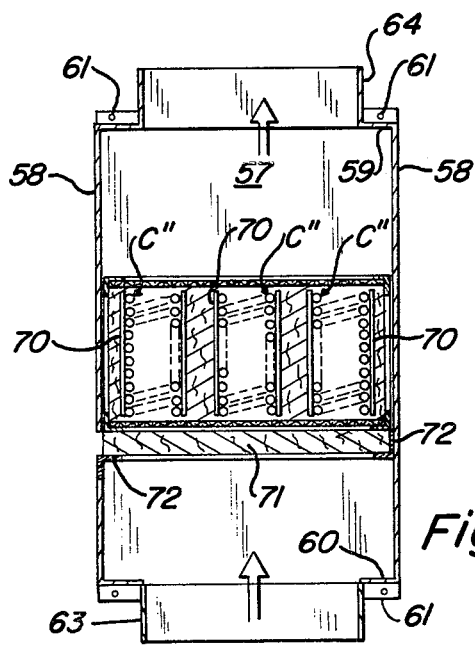
Fig_12
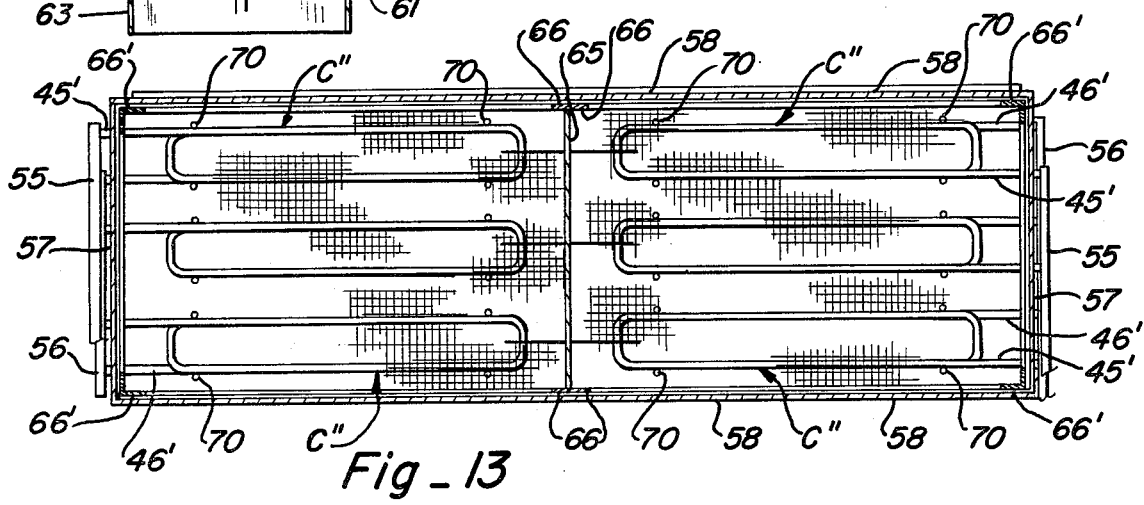
Fig_13

METHOD OF MAKING HEAT EXCHANGES

This application is a continuation-in-part of my copending application Ser. No. 602,685 filed Aug. 7, 1975 for "Makeup Air Tempering for Grease Extraction Ventilator and Heat Exchanger" now abandoned, but a continuation-in-part of which is my application Ser. No. 768,152 filed Feb. 14, 1977 for "Makeup Air Tempering for Grease Extraction Ventilator.

This invention relates to heat a method of making exchangers, more particularly to heat exchangers in which transfer of heat between a liquid and a gas or vapor is desired.

In prior heat exchangers of the countercurrent type, the differential between the temperature of the liquid heating medium or coolant, as the case may be, and the gas or vapor discharged has been several degrees. Even in heat exchangers in which tubing in the form of several parallel pipes is provided with fins, or a pipe coil, again provided with fins, or a tube forming a series of turns in essentially the same plane and again provided with fins, the temperature differential has been unduly great. An increase in pressure, to provide a greater flow of liquid through the tube or pipe or of gas or vapor through the area around the pipe, has not sufficiently increased the heat transfer to warrant the additional pumping or blower expense. In addition, unless the unit is very large and costly, heat exchangers have not transferred heat between a liquid and a gas vapor efficiently enough to utilize low energy differences.

Among the objects of this invention are to provide a novel method of making a heat exchanger; to provide such a method which produces having a greater efficiency, as indicated by the temperature differential between the liquid in and of the gas or vapor out, having a foraminous bed of material through which a gas or vapor passes and in which the foraminous material is in an improved heat conducting relationship with tubing or coils through which a liquid flows, is applicable to a wide variety of uses and which is economical to construct and is effective and efficient in use.

Further objects of this invention include providing such a method which is readily carried out; and to provide such a method which is positive in results.

The essence of the present invention lies in the placement of mesh layers, such as approximating a loosely woven cloth, between successive adjacent and preferably parallel tubular coils or bends through which the liquid is to flow, then compressing the coils to a fraction of their previous distance apart, so that the foraminous layers between the respective coils will be compressed. This not only produces a clamping contact between the foraminous mesh and the coils and increases the surface area of such contact, but also increases the number of strands or filaments of the foraminous material through which heat is conducted to or from the area of passage of the vapor or gas.

The foregoing objects and the novel features of this invention will become apparent from the description which follows, taken in conjunction with the accompanying drawings, in which:

FIG. 1 is a transverse vertical section, taken along line 1—1 of FIG. 2, of a heat exchanger constructed in accordance with the method of this invention.

FIG. 2 is a horizontal section taken along line 2—2 of FIG. 1.

FIG. 3 is a longitudinal vertical section, taken along line 3—3 of FIG. 1.

FIG. 4 is a fragmentary, condensed vertical section, on an enlarged scale, showing a series of spaced coils and layers of uncompressed heat transfer mesh prior to compression of both.

FIG. 5 is a fragmentary vertical section, also on an enlarged scale, showing several coils and heat transfer mesh after compression of both.

FIG. 6 is a condensed vertical section, corresponding to FIG. 4, but on a reduced scale, showing a pair of clamping jaws in position for a compression operation.

FIG. 7 is a vertical section similar to FIG. 1 but showing the clamping jaws of FIG. 6 with an additional set of clamps and at the completion of the clamping operation.

FIG. 8 is a horizontal section corresponding to FIG. 2, showing a further set of clamps and at the completion of the clamping operation.

FIG. 9 is a side elevation, broken away to show interior parts and showing an alternative form of heat exchanger.

FIG. 10 is a horizontal section taken along line 10—10 of FIG. 9.

FIG. 11 is a vertical section similar to FIG. 3 but showing a further alternative form of this invention.

FIG. 12 is a vertical section taken transversely to FIG. 11 along line 12—12 thereof.

FIG. 13 is a horizontal section taken along line 13—13 of FIG. 11.

A heat exchanger E constructed by the method of this invention, as illustrated in FIGS. 1—3, includes a series of coils C embedded in and contacting a foraminous heat transfer medium H. As in FIG. 2, the coils C have sides 10 and ends 11 joined by curved, 90° corners 12 providing a generally rectangular configuration, although it will be understood that many other configurations may be found to be desirable. The foraminous heat transfer medium H is clamped between the coils and the coils and medium are maintained in clamped condition between a perforated plate 13 and a bottom perforated plate 14, each attached in a suitable manner, as by spot welds 15, to side walls 16 and 17 of a housing. The housing also includes a front wall 18 and a rear wall 19, as well as a top wall 20 and a bottom wall 21. For a purpose hereinafter described, side wall 16 may be integral with front wall 18 and side wall 17 may be integral with rear wall 19, with the two angular wall portions being connected at opposite corners by welds 22, as in FIG. 2.

The space between top perforated plate 13 and top wall 20 comprises an inlet chamber or manifold, with an inlet opening 23 in rear wall 19 being connected to an inlet pipe or the like for the gas or vapor, such as air, which passes into the upper manifold and then through the foraminous mesh H, both within the area of the loops of the coils C and also outside the loops of the coils and the respective walls, as indicated by the arrows of FIG. 3. Similarly, adjacent the bottom an outlet manifold is formed between bottom perforated plate 14 and the bottom wall 21. The gas or vapor, such as air, flows from the heat transfer material H into this outlet manifold for discharge through an outlet opening 24 in rear wall 19 to which a suitable pipe or tube may be attached, if necessary, for leading the gas or vapor to a point of use. An inlet 25 and an outlet 26 for coils C, as in FIGS. 2 and 3, extend through front wall 18 at lower and upper positions, so that countercurrent flow of the liquid and gas will be provided. In the event the gas or vapor inlet is at the bottom and the outlet is at the top, the coil liquid may then be delivered to pipe 26 and pass out through pipe 25. As will be evident, the heat exchanger need not be placed with the longitudinal axis of the coil in a vertical position, as shown, but may be placed with such axis in a horizontal position or at any angle between horizontal and vertical.

A screen 27 may be interposed between the top perforated plate and the foraminous material H, as well as between the bottom perforated plate 14 and the foraminous material H, to hold the foraminous material securely between the plates. The plates 13 and 14 may be perforated plates of any type, although an expanded metal plate having solid edges, for welding to the inside of the housing, has been found to be particularly effective in its minimum resistance to gas or vapor flow and its effectiveness in holding and maintaining the heat transfer material clamped within the unit. Above the top perforated plate 13, a filter 28, as of fiberglass, may be interposed to catch any lint or other particles which might tend to enter and clog the foraminous material H. The inlet opening 23 may be made slightly larger than necessary for vapor or gas flow, so that an easily opened access connection may be installed at the hole for the purpose of inspecting and cleaning the filter 28. If desired, for the same purpose, a removable access plate may be incorporated in the top wall 20.

The coils C are initially formed to provide a gap between corresponding portions of adjacent coils of a reasonable distance, such as in excess of the coil diameter, as in FIG. 4. Then, several layers 30 of uncompressed mesh, as of the type previously described, are inserted between adjacent coils, with the intersection of the mesh layer with the opposite end 11 of the coil being accommodated by a slit 31, as in FIG. 2. As will be evident from FIG. 4, the slit permits a series of uncompressed mesh layers 30 which, in uncompressed condition, desirably are somewhat thicker than the individual coil, to be placed between adjacent coils. Additional uncompressed layers 30' are placed on top of the uppermost coil, with a similar set of mesh layers beneath the lowermost coil, so that the coils throughout the entire length thereof will be in engagement, both at the top and at the bottom, with the mesh.

In accordance with this invention, the coils C are compressed together against the previously uncompressed mesh layers 30, in order to provide, as in FIG. 5, compressed mesh 32 between the coils and for a reasonable distance around the coils. This results not only in a contact of the threads, strands, filaments or wires, as the case may be, of the mesh layers with the coils C, but also a nearly solid contact in the compressed area. As will be evident, when a liquid is passed through the coils C while a gas or vapor, such as air, is passed through the foraminous mesh layers, conduction of heat through the strands of the mesh layer will include the central area between the coils and also the area outside the perimeter of the coils. The coils C and mesh layers 30 may be formed of any suitable material. For cooling of air by water, as disclosed in my aforesaid copending application Ser. No. 602,685, the preferred material for the coils C is copper, because of its high rate of heat conductivity and its ductility, while the preferred material for the mesh layers 30 is also copper, not only because of its high rate of heat conduction and ductility, but also its property of tending to stay in any position in which it is crushed or bent. These properties of copper mesh enable a relatively large amount of heat to flow between the coils C and the foraminous material H in either direction. Thus, it will be noted that, with low outside temperatures, it is necessary for the ambient water of the grease extraction ventilator of my aforesaid application Ser. No. 602,685 to heat makeup air coming into the room. In this instance, heat flows from the coils C to the foraminous mesh, thereby heating the cold incoming air. However, when the outside temperature is higher than the room temperature, the ambient temperature of the water circulated through the coils C will be less than the temperature of the outside air, with the result that the liquid flow through the coils C will be cooling the incoming air, with heat flowing to the coils C.

In addition to the compressed threads or strands, wires, etc. of the mesh layers adjacent the coils C, there will be some compression of the remainder of each layer 30, both within the perimeter of the coils and outside the perimeter of the coils, since the initial thickness of layers between coils, as in FIG. 4, may be greater than the diameter of the coil. This compression of the mesh layers against each other, at points spaced from the coils, apparently further advances the heat exchange, since heat can be transferred by conduction between the strands of one mesh layer and the strands of adjacent mesh layers.

The process of making a heat exchanger in accordance with the present invention is illustrated generally in FIGS. 6–8. As indicated previously, the mesh layers 30 are placed between adjacent coils, with the slit 31 at an end of each coil, so that each series of layers and coils may be more readily placed in position for compression. After the additional layers 30' are placed at the top and bottom of the coil, a screen 27 may be placed at both the bottom and top of the mesh layers, together with the top perforated plate 13 and bottom perforated plate 14. This assembly, as in FIG. 6, is then placed within a press, normally hydraulic, having jaws 35 and 36 which are moved toward each other, in order to press simultaneously both the coils and the foraminous material H, as from the condition illustrated by FIG. 4 to that illustrated by FIG. 5. The mesh layers may bulge outwardly at different points around the periphery of the compressed assembly, as a result of compression, but a wood block and a hammer, or other tool, may be utilized in forcing inwardly the outward bulges to a degree consonant with the ability of the side, front and end walls to compress the bulges further. The copper mesh described is well adapted to such a step, since it will normally retain a position to which it is forced.

While this assembly is still compressed and after the bulges have been corrected, the angular pieces, one comprising the side wall 16 and front wall 18 and the other side wall 17 and rear wall 19, are pressed in position, with front wall 18 having appropriate slots for the inlet and outlet pipes 25 and 26. The side walls are forced together, as by conventional clamps 37 and 38 of FIGS. 7 and 8, while clamps 39 and 40 of FIG. 8 engage the front wall 18 and rear wall 19, respectively. Clamp 40 is provided with holes 41, to accommodate the extending pipes 25 and 26. The pairs of clamps 37, 38 and 39, 40 are pushed toward each other to move the angular piece diagonally until the inside of the housing walls reach a position nearly abutting or closely adjacent the periphery of the perforated plates 13 and 14. At this time, the abutting edges of the angular parts may be welded, as at 22, while the edges of the perforated plates may be tack welded to the inside of the side walls 16 and 17, as by tack or sport welds 15 of FIG. 7. The assembly may then be released from the clamps and press, at which time the top plate 20 and the bottom plate 21 may be attached to previously assembled walls, as by welding.

In the alternative construction illustrated in FIGS. 9 and 10, a pair of coils C' coupled by a connecting pipe 44, may be installed in a spaced lateral relation within a foraminous transfer material H, which may consist of deformable mesh layers in the nature of woven wire cloth. One coil C' has an inlet 45 and the other an outlet 46, although the inlet and outlet may be reversed. It will be noted that, in one coil, the liquid flows countercurrent to the gas or vapor, but the flow is reversed for the opposite coil. This insures that the flow through at least one coil is countercurrent, irrespective of the inlet and outlet used. Each coil may be generally rectangular in configuration, with spaced and generally parallel ends and sides of the coil ascending in an otherwise spiral configuration. The layers of the mesh may be inserted between the coils, spaced apart for a slightly greater distance than their diameter, in the manner illustrated in FIG. 4, with a pair of slits 47 adapted to overlap an end of laterally adjacent coils, to accommodate the spiral configuration. As before, additional mesh layers may be placed both above and below the coils, while the coils and mesh layers are compressed between a top perforated plate 48 and a bottom perforated plate 49, with a screen 27' interposed between the perforated plates and the mesh, as desired. This assembly is then compressed until the mesh layers between adjacent coils are compressed and clamped, not only to provide a pressure contact of the mesh wire with the respective coils, but also to increase the surface area of each coil contacted by the mesh layers.

An air or gas inlet 23' may be placed at an upper position in the rear wall 19', while a front wall 18' is also provided with holes or slots to receive the inlet 45 and outlet 46 for the coils. A lower outlet opening 24', for the discharge of air or other gas or vapor, may be made in side wall 17' or at any other suitable location within the exterior plate surrounding the outlet manifold, formed between a lower perforated plate 49 and bottom wall 21'. The space between upper perforated plate 48 and top wall 20' serves as an inlet manifold, while inlet opening 23' may be moved to any desired position around the periphery of the inlet manifold.

The steps of clamping the mesh layers, coils and perforated plate assembly may be carried out similarly to those previously described, i.e. first compressing the assembly to merely a portion of its initial height, then pushing the lateral bulges inwardly and clamping the angular plates, described previously, against the compressed assembly. As before, when the desired compression has been obtained, the top and bottom perforated plates are attached, as by spot or tack welding, to the inside of the side walls 16' and 17', while the adjacent edges of the angular pieces are again attached, as by welds 22'.

In the alternative form illustrated in FIGS. 11–13, there are two series of coils C'', with three coils in each series, while the coils of each series are connected in parallel by upper inlet manifolds 55 and lower outlet manifolds 56, to which inlet pipes 45' and outlet pipes 46', respectively, are connected for the direction of flow of air shown by the arrows. For a reverse flow of air or other gas or vapors, the inlet and outlet manifolds for the coils would be reversed to provide countercurrent flow. The heat transfer material H is again compressed between adjacent loops of each coil, to provide a greater area of contact of the material with the coil pipes and also a compression of the strands or wires of the mesh against the pipes. The three coils of each set may be placed side by side to increase the effective area of the coils and end to end so that the manifolds 55 and 56 may be placed at each end of the housing in which the coils are installed. This housing includes end plates 57, removably connected to side plates 58 and top and bottom plates 59 and 60, respectively, by flanges and bolt connections 61, as shown. Bottom plate 60 is provided with an air or gas inlet 63, while top plate 59 is provided with an air or gas outlet 64. The two coil series are separated by a web plate 65 having a flange 66 extending to each side, at each end, while end plates 57 are provided at their edges with inwardly extending flanges 66'. A top perforated plate 68 and bottom perforated plate 69, for each set of coils, holds a screen 27'' against the heat exchange material H, to hold it in compression until the edges of the perforated plates can be welded to the corresponding flanges 66 and 66'.

Prior to compression of the heat exchange material H in the coils C'', a series of rods 70 is pushed into the mesh material alongside each of the longer runs of the generally rectangular coils C'', as in FIG. 13. During compression of the mesh material and coils, the mesh material will hold the rods in position, to prevent lateral displacement of any of the coils. The rods 70 are, of course, preferably shorter than the distance between opposed screens 27'' and thus produce no interference with the compression or the attachment of the perforated plates 68 and 69 in final position.

A filter 71 may be placed at the air entrance area of the heat exchange material H, in order to prevent extraneous matter from becoming lodged in the heat exchange material. The filter 71 may be placed within a frame 72, for which conventional (not shown) support ledges may be provided, as well as conventional (not shown) provision for withdrawing the filter 71 for inspection and/or cleaning.

It will be understood that different ways of carrying out the compression of the mesh layer and coil assembly may be utilized. Furthermore, the material of which the parts are made may vary, as in accordance with the properties of the fluid passing through the coils or the gas or vapor passing through the foraminous material or both. For some fluids, it may be desirable to use aluminum or other light metal or alloy. For other fluids, it may be desirable to use stainless steel or other material resistant to corrosion, such as monel metal. In other instances, it may be desirable to use titanium or selenium or other material, such as a plastic. In general, the metal or other material which will provide the greatest rate of heat transfer is desirable, except when the properties of one or both fluids require a different material.

Although alternative embodiments of this invention have been illustrated and described, it will be understood that other embodiments may exist and that various changes may be made, all without departing from the spirit and scope of this invention.

What is claimed is:

1. A method of making a heat exchanger, comprising:
   inserting layers of deformable mesh having strands between adjacent turns and across the space encompassed by the turns of spaced, connected and generally parallel hollow coils through which a heat exchange liquid is to be passed;

exerting a compression force on said mesh layers toward said coils until the distance between adjacent coils diminishes, and said mesh layers are compressed between said coils and against each other and are deformed into contact with said coils; and restraining said mesh to maintain the deformed and compressed condition thereof and the compression contact of the deformed strands with the coils to permit conduction of heat along the strands between the coils and the space encompassed by the turns through which a gas is to be passed in a direction transverse to the planes of the respective coils.

2. A method as defined in claim 1, including:

placing spaced perforated plates, prior to compression, transverse to the axis of said coils and engaging the opposite sides of said mesh layers;

providing a housing around said mesh layers and coils; and securing said perforated plates to said housing to prevent expansion of said coils and to maintain the clamped condition of said mesh layers between said coils.

3. A method of making a heat exchanger, comprising:

producing, from a hollow tube, a coil through which a heat exchange liquid is to be passed and having a series of connected, generally parallel turns, with adjacent turns a predetermined distance apart in the endwise direction of said coils, transverse to the approximate planes of said turns;

inserting layers of deformable mesh having strands between each pair of adjacent coils to substantially fill the space between adjacent coils and the space enclosed by each turn, said layers extending across the spaces encompassed by said turns;

exerting a compression force on said mesh layers toward said coils in the endwise direction thereof until the distance between adjacnet coils diminishes, and said mesh layers are compressed between said coils and against each other and are deformed into contact with said coils; and restraining said mesh to maintain the deformed and compressed condition thereof and the compression contact of the deformed strands with the coils to permit conduction of heat along the strands between the coils and the space encompassed by the turns through which a gas is to be passed in a direction transverse to the planes of the respective coils.

4. A method as defined in claim 3, wherein:
said mesh members are formed of metal.

5. A method as defined in claim 3, wherein:
said coils are formed of metal

6. A method as defined in claim 3, wherein:
said coils and said mesh members are formed of a metal having a comparatively high thermal conductivity.

7. A method of making a heat exchanger, comprising:

inserting layers of mesh between adjacent turns of spaced, connected and generally parallel coils;

slitting said mesh layers centrally and from one end toward the center a distance sufficient for a mesh layer to be disposed on opposite sides of the same coil at the position of said slit and to extend beyond said coil in the direction of said slit; and exerting a compression force on said mesh layers toward said coils until the distance between adjacent coils diminishes, and said mesh layers are compressed between said coils and against each other and are deformed into contact with said coils.

8. A method as defined in claim 7, wherein said coils and said mesh are formed of copper.

9. A method as defined in claim 7 wherein:

said housing includes a pair of angular parts, compressed together about said mesh layers and coils at adjacent sides:

attaching said perforated plates to the inside of said angular parts; and attaching said angular parts together at the abutting edges, at opposite corners thereof.

10. A method as defined in claim 8, including:

placing a screen between each perforated plate and said mesh; and forming fluid chambers at each end of said coils.

11. A method of making a heat exchanger, comprising:

inserting layers of mesh between adjacent turns of spaced, connected and generally parallel coils;

inserting a series of pins in said mesh at different points alongside said coils to guide said coils during compression and maintain a generally parallel relation thereof; and exerting a compression force on said mesh layers toward said coils until the distance between adjacent coils diminishes, and said mesh layers are compressed between said coils and against each other and are deformed into contact with said coils.

* * * * *

UNITED STATES PATENT AND TRADEMARK OFFICE
CERTIFICATE OF CORRECTION

PATENT NO. : 4,071,935
DATED : February 7, 1978
INVENTOR(S) : Victor D. Molitor

It is certified that error appears in the above-identified patent and that said Letters Patent are hereby corrected as shown below:

In the title, "EXCHANGES" should read --EXCHANGERS--. Column 1, line 10, "heat" should be deleted; line 11, before "exchangers", --heat-- should be inserted; line 33, after "produces",--a heat exchanger-- should be inserted;
Column 3, line 37, claim 3, "adjacnet" should read --adjacent--.

Signed and Sealed this

Fourth Day of July 1978

[SEAL]

Attest:

RUTH C. MASON
Attesting Officer

DONALD W. BANNER
Commissioner of Patents and Trademarks